US00RE33819E

United States Patent [19]

Moore et al.

[11] E Patent Number: Re. 33,819

[45] Reissued Date of Patent: Feb. 11, 1992

[54] MAGENTA DYE-DONOR ELEMENT USED IN THERMAL DYE TRANSFER

[75] Inventors: William H. Moore; Max A. Weaver, both of Kingsport, Tenn.; Kin K. Lum, Webster, N.Y.

[73] Assignee: Eastman Kodak Company, Rochester, N.Y.

[21] Appl. No.: 325,173

[22] Filed: Mar. 17, 1989

Related U.S. Patent Documents

Reissue of:

[64] Patent No.: 4,698,651
Issued: Oct. 6, 1987
Appl. No.: 923,444
Filed: Oct. 27, 1986

U.S. Applications:

[63] Continuation-in-part of Ser. No. 813,208, Dec. 24, 1985, abandoned.

[51] Int. Cl.[5] ..... B41M 5/035; B41M 5/26

[52] U.S. Cl. ..... 503/227; 8/471; 427/146; 427/256; 428/195; 428/207; 428/411.1; 428/480; 428/913; 428/914; 430/945

[58] Field of Search ..... 8/470, 471; 427/146, 427/256; 428/195, 207, 411.1, 480, 913, 914; 430/945; 503/227

[56] References Cited

U.S. PATENT DOCUMENTS

| | | | |
|---|---|---|---|
| 4,374,767 | 2/1983 | Weaver et al. | 260/158 |
| 4,374,768 | 2/1983 | Fleischer et al. | 260/158 |

FOREIGN PATENT DOCUMENTS

| | | | |
|---|---|---|---|
| 30028 | 6/1981 | European Pat. Off. | 8/471 |
| 30695 | 6/1981 | European Pat. Off. | 8/471 |
| 151287 | 12/1984 | European Pat. Off. | 8/471 |
| 99378 | 8/1977 | Japan | 260/158 |
| 30394 | 2/1985 | Japan | 260/158 |
| 1379233 | 1/1975 | United Kingdom | 260/158 |
| 1465895 | 2/1977 | United Kingdom | 260/158 |

*Primary Examiner*—Bruce H. Hess
*Attorney, Agent, or Firm*—Harold E. Cole

[57] ABSTRACT

A magenta dye-donor element for thermal dye transfer comprises a support having thereon a magenta dye dispersed in a polymeric binder, the magenta dye comprising a substituted 5-arylazoisothiazole.

In a preferred embodiment, the magenta dye has the formula

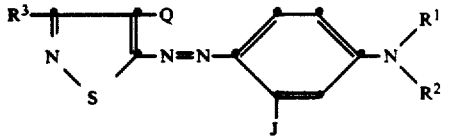

wherein $R^1$ and $R^2$ may each independently be hydrogen, alkyl, allyl, cycloalkyl or aryl; or $R^1$ and $R^2$ may be taken together to form a ring; or $R^1$ or $R^2$ may be part of a 5- or 6-membered heterocyclic ring;

$R^3$ may be hydrogen, alkyl, aryl, alkylthio or halogen;

J may be alkyl, aryl or NHA, where A is an acyl or sulfonyl radical; and

Q may be cyano, thiocyanato, alkylthio or alkoxycarbonyl.

31 Claims, No Drawings

MAGENTA DYE-DONOR ELEMENT USED IN THERMAL DYE TRANSFER

Matter enclosed in heavy brackets [ ] appears in the original patent but forms no part of this reissue specification; matter printed in italics indicates the additions made by reissue. [This application is a continuation-in-part of U.S. application Ser. No. 813,208, filed Dec. 24, 1985, now abandoned.]

This application is a reissue application for U.S. Pat. No. 4,698,651 issued on Oct. 6, 1987, based on U.S. Ser. No. 923,444, filed Oct. 27, 1986, as a continuation-*in-part of U.S. Ser. No. 813,208, filed Dec. 24, 1985, now abandoned.*

This invention relates to magenta dye-donor elements used in thermal dye transfer which have good hue and dye stability.

In recent years, thermal transfer systems have been developed to obtain prints from pictures which have been generated electronically from a color video camera. According to one way of obtaining such prints, an electronic picture is first subjected to color separation by color filters. The respective color-separation images are then converted into electrical signals. These signals are then operated on to produce cyan, magenta and yellow electrical signals. These signals are then transmitted to a thermal printer. To obtain the print, a cyan, magenta or yellow dye-donor element is placed face-to-face with a dye-receiving element. The two are then inserted between a thermal printing head and a platen roller. A line-type thermal printing head is used to apply heat from the back of the dye-donor sheet. The thermal printing head has many heating elements and is heated up sequentially in response to the cyan, magenta and yellow signals. The process is then repeated for the other two colors. A color hard copy is thus obtained which corresponds to the original picture viewed on a screen. Further details of this process and an apparatus for carrying it out are contained in U.S. Pat. No. 4,621,271 by Brownstein entitled "Apparatus and Method for Controlling A Thermal Printer Apparatus," issued Nov. 4, 1986, the disclosure of which is hereby incorporated by reference.

A problem has existed with the use of certain dyes in dye-donor elements for thermal dye transfer printing. Many of the dyes proposed for use do not have adequate stability to light. Others do not have good hue. It would be desirable to provide dyes which have good light stability and have improved hues.

U.S. Pat. Nos. 4,374,767 and 4,374,768, Japanese Patent Publication No. 52/099,378, British Pat. No. 1,379,233 and European Pat. No. 151,287 relate to arylazoisothiazole dyes similar to those used in this invention. They are described as textile dyes, however, and have no teaching that such dyes could be used in a dye-donar element for thermal dye transfer.

Japanese Patent Publication No. 60/030394 relates to magenta thiadiazole dyes used in thermal transfer. Although these compounds have some structural similarity to those of the invention, the compounds of this invention have significant differences in properties which provide the good hue and light stability obtained.

British Pat. No. 1,465,895 relates to the use of certain disperse azo dyes for transfer printing. The dye employed in this invention are not disclosed in this reference, however.

Substantial improvements in light stability and hues are achieved in accordance with this invention which comprises a magenta dye-donor element for thermal dye transfer comprising a support having thereon a dye layer comprising a magenta dye dispersed in a polymeric binder, said magenta dye comprising a substituted 5-arylazoisothiazole.

In a preferred embodiment of the invention, the substituted 5-arylazoisothiazole has the following formula:

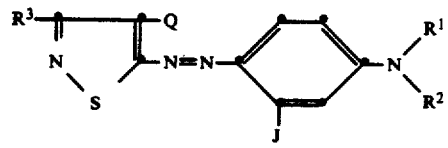

wherein:

$R^1$ and $R^2$ may each independently be hydrogen; substituted or unsubstituted alkyl or allyl of from 1 to about 6 carbon atoms such as methyl, ethyl, propyl, isopropyl, butyl, pentyl, hexyl or such alkyl groups substituted with hydroxy, acyloxy, alkoxy, aryl, cyano, acylamido, halogen, etc.; substituted or unsubstituted cycloalkyl of from 5 to about 7 carbon atoms such as cyclopentyl, cyclohexyl, p-methylcyclohexyl, etc.; or substituted or unsubstituted aryl of from about 5 to about 10 carbon atoms such as phenyl, p-tolyl, m-chlorophenyl, p-methoxyphenyl, m-bromophenyl, o-tolyl, etc.; or $R^1$ and $R^2$ may be taken together to form a ring such as pentamethylene, hexamethylene, etc.; or a 5- or 6-membered heterocyclic ring may be formed with $R^1$ and $R^2$, the nitrogen to which $R^1$ or $R^2$ is attached, and either carbon atom ortho to the carbon attached to the nitrogen atom;

$R^3$ may be hydrogen; substituted or unsubstituted alkyl of from 1 to about 6 carbon atoms such a those listed above for $R^1$ and $R^2$; substituted or unsubstituted aryl of from about 5 to about 10 carbon atoms such as phenyl, p-tolyl, m-chlorophenyl, p-methoxyphenyl, m-bromophenyl, o-tolyl, etc.; alkylthio or halogen;

J may be substituted or unsubstituted alkyl of from 1 to about 6 carbon atoms or substituted or unsubstituted aryl of from about 5 to about 10 carbon atoms such as such as those listed above for $R_3$; or NHA, where A is an acyl or sulfonyl radical such as formyl, lower alkanoyl, aroyl, cyclohexylcarbonyl, lower alkoxycarbonyl, aryloxycarbonyl, lower alkylsulfonyl, cyclohexylsulfonyl, arylsulfonyl, carbamoyl, lower alkylcarbamoyl, arylcarbamoyl, sulfamoyl, lower alkylsulfamoyl, furoyl, etc; and Q may be cyano, thiocyanato, alkylthio or alkoxycarbonyl.

The compounds used in the invention may be prepared by established synthetic procedures such as are described in Example 2 of U.S. Pat. No. 3,770,370 of Weaver et al.

In a preferred embodiment of the invention, $R^3$ is methyl and Q is CN. In another preferred embodiment of the invention, J is —$NHCOCH_3$. In still another preferred embodiment of the invention, $R_1$ is $C_2H_5$ and $R^2$ is $CH_2C_6H_5$, cyclohexyl or $CH_2CH_2O_2CCH_3$. In yet another preferred embodiment of the invention, $R^1$ and $R^2$ are each n—$C_3H_7$ or $C_2H_5$.

Compounds included within the scope of the invention include the following:

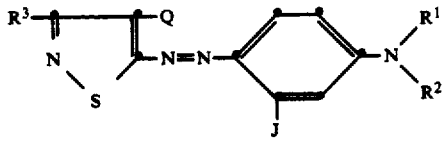

| Compound No. | $R^1$ | $R^2$ | J | $R^3$ | Q |
|---|---|---|---|---|---|
| 1 | $C_2H_5$ | $CH_2C_6H_5$ | $-NH-\overset{O}{\overset{\|\|}{C}}CH_3$ | $CH_3$ | CN |
| 2 | $C_2H_5$ | 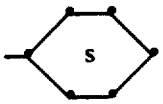 | $-NH-\overset{O}{\overset{\|\|}{C}}CH_3$ | $CH_3$ | CN |
| 3 | $C_2H_5$ | $CH_2CH_2O_2CCH_3$ | $-NH-\overset{O}{\overset{\|\|}{C}}CH_3$ | $CH_3$ | CN |
| 4 | n-$C_3H_7$ | n-$C_3H_7$ | $-NH-\overset{O}{\overset{\|\|}{C}}CH_3$ | $CH_3$ | CN |
| 5 | H | $CH_2CH_2OCH_3$ | $-NH-\overset{O}{\overset{\|\|}{C}}CH_3$ | H | CN |
| 6 | $-CH_2CH_2O\overset{O}{\overset{\|\|}{C}}CH_3$ | $-CH_2CH_2O_2CCH_3$ | $-NH-\overset{O}{\overset{\|\|}{C}}CH_3$ | H | CN |
| 7 | H | $-CH_2CH_2CN$ | $-NH-SO_2C_6H_5$ | $C_2H_5$ | CN |
| 8 | $CH_2CH_2OH$ | $-C_2H_5$ | $-NH-\overset{O}{\overset{\|\|}{C}}CH_2OCH_3$ | $C_6H_5$ | CN |
| 9 | $C_2H_5$ | $CH_2C_6H_5$ | $-NH-\overset{O}{\overset{\|\|}{C}}OC_2H_5$ | $CH_2C_6H_5$ | CN |
| 10 | $C_2H_5$ | $C_2H_5$ | $-NHSO_2CH_3$ | $CH_2CH_2O_2CCH_3$ | CN |
| 11 | $C_2H_5$ | $-CH_2CH_2N\overset{O}{\overset{\|\|}{C}}C_6H_5$ (H) | $-NH-\overset{O}{\overset{\|\|}{C}}CH_3$ | n-$C_3H_7$ | CN |
| 12 | $C_2H_5$ | $-CH_2CH_2O\overset{O}{\overset{\|\|}{C}}NHC_6H_5$ | $-NH-\overset{O}{\overset{\|\|}{C}}CH_3$ | $CH_2CH_2CN$ | CN |
| 13 | n-$C_3H_7$ | 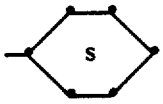 | $-NH-\overset{O}{\overset{\|\|}{C}}CH_3$ | 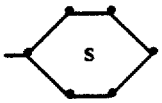 | CN |
| 14 | $C_2H_5$ | $CH_2C_6H_5$ | $-NHCOC_6H_5$ | $CH_3$ | CN |
| 15 | $CH_3$ | $CH_3$ | $-NHCOCF_3$ | $CH_3$ | CN |
| 16 | H | $CH_2CH(CH_3)CH_2OCH_3$ | $-NHCOCH_3$ | $CH_3$ | CN |
| 17 | H | $CH(CH_3)CH_2CH_2CH(CH_3)_2$ | $-NHCOCH_3$* | $CH_3$ | CN |
| 18 | $C_2H_5$ | $C_2H_5$ | $-NHCONHC_6H_5$ | $CH_3$ | CN |
| 19 | $C_2H_5$ | $C_2H_5$ | 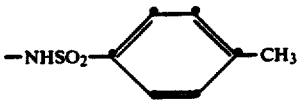 | $CH_3$ | CN |
| 20 | $C_2H_5$ | $C_2H_5$ | $-NHSO_2CH_3$ | $CH_3$ | CN |
| 21 | $C_2H_5$ | $CH_2CH_2NHCOCH_3$ | $CH_3$ | $CH_3$ | CN |
| 22 | $C_2H_5$ | $CH_2CH_2OCONHC_6H_5$ | $CH_3$ | $CH_3$ | CN |

-continued

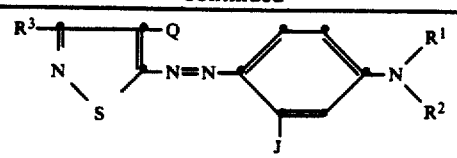

| Compound No. | $R^1$ | $R^2$ | J | $R^3$ | Q |
|---|---|---|---|---|---|
| 23 | $C_2H_5$ | 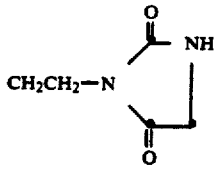 | $CH_3$ | $CH_3$ | CN |
| 24 | n-$C_3H_7$ | n-$C_3H_7$ | $-NHCOCH_3$ | $-SCH_3$ | CN |
| 25 | $C_2H_5$ | $CH_2CH_2OCOCH_3$ | $-NHCOCH_3$ | $-SCH_3$ | CN |
| 26 | $C_2H_5$ | $C_2H_5$ | $-NHCOCH_3$ | Cl | CN |
| 27 | $C_2H_5$ | $C_2H_5$ | $-NHCOCH_3$ | $CH_3$ | $-SCN$ |
| 28 | $C_2H_5$ | $CH_2C_6H_5$ | $-NHCOCH_3$ | $CH_3$ | $-CO_2C_2H_5$ |
| 29 | $C_2H_5$ | $C_2H_5$ | $-NHCOCH_3$ | $CH_3$ | $-SCH_2CH_2OCOCH_3$ |

*also has a $CH_3$ group p- to J

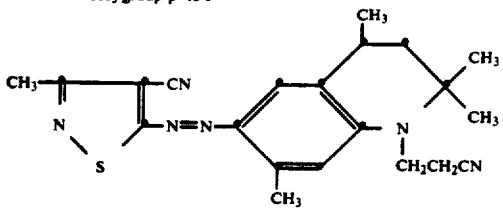

A dye-barrier layer may be employed in the dye-donor elements of the invention to improve the density of the transferred dye. Such dye-barrier layer materials include hydrophilic materials such as those described and claimed in application Ser. No. 813,294 entitled "Dye-Barrier Layer for Dye-Donor Element Used in Thermal Dye Transfer" by Vanier, Lum and Bowman, filed Dec. 24, 1985.

The dye in the dye-donor element of the invention is dispersed in a polymeric binder such as a cellulose derivative, e.g., cellulose acetate hydrogen phthalate, cellulose acetate, cellulose acetate propionate, cellulose acetate butyrate, cellulose triacetate; a polycarbonate; poly(styrene-co-acrylonitrile), a poly(sulfone) or a poly(phenylene oxide). The binder may be used at a coverage of from about 0.1 to about 5 g/m$^2$.

The dye layer of the dye-donor element may be coated on the support or printed thereon by a printing technique such as a gravure process.

Any material can be used as the support for the dye-donor element of the invention provided it is dimensionally stable and can withstand the heat of the thermal printing heads. Such materials include polyesters such as poly(ethylene terephthalate); polyamides; polycarbonates; glassine paper; condenser paper; cellulose esters such as cellulose acetate; fluorine polymers such as polyvinylidene fluoride or poly(tetrafluoroethylene-cohexafluoropropylene); polyethers such as polyoxymethylene; polyacetals; polyolefins such as polystyrene, polyethylene, polypropylene or methylpentane polymers; and polyimides such as polyimide-amides and polyether-imides. The support generally has a thickness of from about 2 to about 30 μm. It may also be coated with a subbing layer, if desired.

The reverse side of the dye-donor element may be coated with a slipping layer to prevent the printing head from sticking to the dye-donor element. Such a slipping layer would comprise a lubricating material such as a surface active agent, a liquid lubricant, a solid lubricant or mixtures thereof, with or without a polymeric binder. Preferred lubricating materials include oils or semi-crystalline organic solids that melt below 100° C. such as poly(vinyl stearate), beeswax, perfluorinated alkyl ester polyethers, poly(caprolactone), carbowax or poly(ethylene glycols). Suitable polymeric binders for the slipping layer include poly(vinyl alcohol-co-butyral), poly(vinyl alcohol-co-acetal), poly(styrene), poly(vinyl acetate), cellulose acetate butyrate, cellulose acetate, or ethyl cellulose.

The amount of the lubricating material to be used in the slipping layer depends largely on the type of lubricating material, but is generally in the range of about 0.001 to about 2 g/m$^2$. If a polymeric binder is employed, the lubricating material is present in the range of 0.1 to 50 weight %, preferably 0.5 to 40, of the polymeric binder employed.

The dye-receiving element that is used with the dye-donor element of the invention usually comprises a support having thereon a dye image-receiving layer. The support may be a transparent film such as a poly(ether sulfone), a polyimide, a cellulose ester such as cellulose acetate, a poly(vinyl alcohol-co-acetal) or a poly(ethylene terephthalate). The support for the dye-receiving element may also be reflective such as baryta-coated paper, white polyester (polyester with white pigment incorporated therein), an ivory paper, a condenser paper or a synthetic paper such as duPont Tyvek®. In a preferred embodiment, polyester with a white pigment incorporated therein is employed.

The dye image-receiving layer may comprise, for example, a polycarbonate, a polyurethane, a polyester, polyvinyl chloride, poly(styrene-co-acrylonitrile), poly(caprolactone) or mixtures thereof. The dye image-receiving layer may be present in any amount which is effective for the intended purpose. In general, good results have been obtained at a concentration of from about 1 to about 5 g/m$^2$.

As noted above, the dye-donor elements of the invention are used to form a dye transfer image. Such a process comprises imagewise-heating a dye-donor element as described above and transferring a dye image to a dye receiving element to form the dye transfer image.

The dye-donor element of the invention may be used in sheet form or in a continuous roll or ribbon. If a continuous roll or ribbon is employed, it may have only the magenta dye thereon as described above or may have alternating areas of other different dyes, such as sublimable cyan and/or yellow and/or black or other dyes. Such dyes are disclosed in U.S. Pat. No. 4,541,830, the disclosure of which is hereby incorporated by reference. Thus, one-, two-, three- or four-color elements (or higher numbers also) are included within the scope of the invention.

In a preferred embodiment of the invention, the dye-donor element comprises a poly(ethylene terephthalate) support coated with sequential repeating areas of cyan, yellow and the magenta dye as described above, and the above process steps are sequentially performed for each color to obtain a three-color dye transfer image. Of course, when the process is only performed for a single color, then a monochrome dye transfer image is obtained.

Thermal printing heads which can be used to transfer dye from the dye-donor elements of the invention are available commercially. There can be employed, for example, a Fujitsu Thermal Head (FTP-040 MCSOO1), a TDK Thermal Head F415 HH7-1089 or a Rohm Thermal Head KE 2008-F3.

A thermal dye transfer assemblage of the invention comprises (a) a dye-donor element as described above, and (b) a dye-receiving element as described above, the dye-receiving element being in a superposed relationship with the dye-donor element so that the dye layer of the donor element is in contact with the dye image-receiving layer of the receiving element.

The above assemblage comprising these two elements may be preassembled as an integral unit when a monochrome image is to be obtained. This may be done by temporarily adhering the two elements together at their margins. After transfer, the dye-receiving element is then peeled apart to reveal the dye transfer image.

When a three-color image is to be obtained, the above assemblage is formed on three occasions during the time when heat is applied by the thermal printing head. After the first dye is transferred, the elements are peeled apart. A second dye-donor element (or another area of the donor element with a different dye area) is then brought in register with the dye-receiving element and the process repeated. The third color is obtained in the same manner.

The following examples are provided to illustrate the invention.

(A) A magenta dye-donor element was prepared by coating the following layers in the order recited on a 6 μm poly(ethylene terephthalate) support:

(1) Dye-barrier layer of gelatin nitrate (gelatin, cellulose, nitrate, and salicyclic acid in approximately 20:5:2 weight ratio in a solvent of acetone, methanol and water) (0.20 g/m$^2$), and (2) Dye layer containing a magenta dye as identified in the following Table 1 (0.17–0.22 g/m$^2$) in cellulose acetate hydrogen phthalate (0.30–0.33 g/m$^2$) coated from an acetone/2-butanone/cyclohexanone solvent.

On the back side of the element, a slipping layer of poly(vinyl stearate) (0.31 g/m$^2$) in cellulose acetate butyrate (0.55 g/m$^2$) was coated from tetrahydrofuran solvent.

TABLE 1

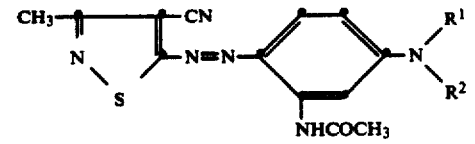

| Compound No. | $R^1$ | $R^2$ |
|---|---|---|
| 1 | $-C_2H_5$ | $-CH_2C_6H_5$ |
| 2 | $-C_2H_5$ | 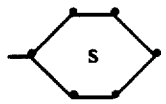 |
| 3 | $-C_2H_5$ | $-CH_2CH_2O_2CCH_3$ |
| 4 | $-nC_3H_7$ | $-n-C_3H_7$ |

Control Compound 1

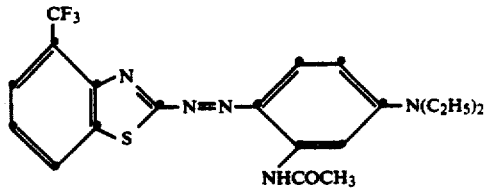

(U.S. Pat. No. 4,052,379)

Control Compound 2

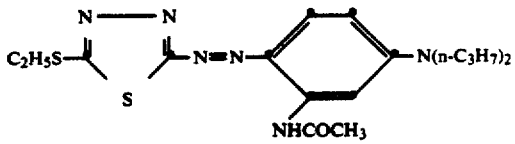

Control Compound 3

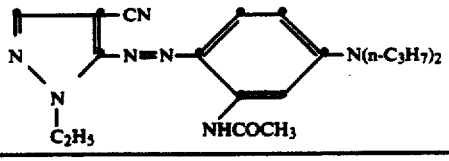

Dye receiving elements were prepared by coating a solution of Makrolon 5705 ® (Bayer AG Corporation) polycarbonate resin (2.9 g/m$^2$) in a methylene chloride and trichloroethylene solvent mixture on an ICI Melinex 990 ® white polyester support for density evaluations or on a transparent poly(ethylene terephthalate) film support for spectral absorption evaluations.

The dye side of the dye-donor element strip 0.75 inches (19 mm) wide was placed in contact with the dye image-receiving layer of the dye-receiver element of the same width. The assemblage was fastened in the jaws of a stepper motor driven pulling device. The assemblage was laid on top of a 0.55 (14 ) diameter rubber roller and a Fujitsu Thermal Head (FTP-040MCS001) and was pressed with a spring at a force of 3.5 pounds (1.6 kg) against the dye-donor element side of the assemblage pushing it against the rubber roller.

The imaging electronics were activated causing the pulling device to draw the assemblage between the printing head and roller at 0.123 inches/sec (3.1 mm/sec). Coincidentally, the resistive elements in the thermal print head were heated at 0.5 msec increments from 0 to 4.5 msec to generate a graduated density test pattern. The voltage supplied to the print head was approximately 19 v representing approximately 1.75 watts/dot. Estimated head temperature was 250°–400° C.

The dye-receiving element was separated from the dye-donor element and the Status A green reflection density of the step image was read. The image was then subjected to "HID-fading": 4 days, 50 kLux, 5400 K., 32° C., approximately 25% RH. The density loss at a density near 1.0 was calculated.

The following dye stability data were obtained:

TABLE 2

| Dye | ΔD (at initial 1.0 density) |
|---|---|
| Compound 1 | −0.12 |
| Compound 2 | −0.12 |
| Compound 3 | −0.12 |
| Compound 4 | −0.12 |
| Control 1 | −0.38 |
| Control 2 | −0.43 |
| Control 3 | −0.18 |

Use of the compounds in accordance with the invention showed superior light stability as compared to a variety of control dyes.

The light absorption spectra from 400 to 700 nm were also obtained after transfer of an area of the dye to the transparent support receiver in the manner indicated above. From a computer normalized 1.0 density curve, the λ-max, and HBW (half-band width=width of the dye absorption envelope at one-half the maximum dye density) were calculated. The following results were obtained.

TABLE 3

| Dye | λ-max | HBW |
|---|---|---|
| Compound 1 | 548 | 96 |
| Compound 2 | 558 | 83 |
| Compound 3 | 546 | 95 |
| Compound 4 | 558 | 82 |
| Control 1 | 538 | 102 |
| Control 2 | 525 | 81 |
| Control 3 | 514 | 81 |

The dyes of the invention are of good magenta hue and all have λ-max in the desired region of 545 to 560 nm. The control dyes are all too red (too much absorption on the short wavelength side). The control dye 3 with relatively good dye stability was the poorest for hue.

EXAMPLE 2

A magenta dye-donor element was prepared by coating the following layers in the order recited on a 6 μm poly(ethylene terephthalate) support:

(1) Dye-barrier layer of poly(acrylic) acid (0.16 g/m²) coated from water, and (2) Dye layer containing a magenta dye as identified in the following Table 4 (0.41 mmoles/m²) (0.17–0.20 g/m²), a cellulose acetate binder (40% acetyl) at a weight equal to 1.5 × that of the dye, and FC-431 ® 3M Corp. (2.2 mg/m²), coated from a 2-butanone/cyclohexanone solvent mixture.

On the back side of the element was coated a slipping layer of the type disclosed in copending U.S. patent application Ser. No. 813,199 of Vanier et al., filed Dec. 24, 1985.

Dye-receiving elements were prepared as in Example 1.

The dye side of the dye-donor element strip 0.75 inches (19 mm) wide was placed in contact with the dye image-receiving layer of the dye-receiver element of the same width. The assemblage was fastened in the jaws of a stepper motor driven pulling device. The assemblage was laid on top of a 0.55 (14 mm) diameter rubber roller and a TDK Thermal Head (No. L-133) and was pressed with a spring at a force of 8.0 pounds (3.6 kg) against the dye-donor element side of the assemblage pushing it against the rubber roller.

The imaging electronics were activated causing the pulling device to draw the assemblage between the printing head and roller at 0.123 inches/sec (3.1 mm/sec). Coincidentally, the resistive elements in the thermal print head were pulse-heated at increments from 0 to 8.3 msec to generate a graduated density test pattern. The voltage supplied to the print head was approximately 22 v representing approximately 1.5 watts/dot (12 mjoules/dot) for maximum power.

The dye-receiving element was separated from the dye-donor element and dye stability and light absorption data were obtained as described in Example 1 except that the dye stability data was calculated as percent density loss from a mid-scale density near 1.0. The following results were obtained.

TABLE 4

| Dye Cmpd. | Density Loss (%) | λ max (nm) | HBW (nm) |
|---|---|---|---|
| 1 | 8 | 548 | 96 |
| 14 | 11 | 542 | 93 |
| 15 | 17 | 537 | 93 |
| 16 | 17 | 528 | 93 |
| 17 | 16 | 542 | 91 |
| 18 | 32 | 553 | 94 |
| 19 | 15 | 543 | 91 |
| 20 | 19 | 542 | 92 |
| 21 | 4 | 526 | 135 |
| 22 | 12 | 535 | 106 |
| 23 | 7 | 536 | 104 |
| 24 | 5 | 562 | 86 |
| 25 | 8 | 548 | 93 |
| 26 | 21 | 561 | 90 |
| 27 | 14 | 540 | 86 |
| 28 | 17 | 524 | 95 |
| 29 | 28 | 524 | 88 |
| 30 | 16 | 530 | 105 |
| Cont. 1 | 34 | 538 | 102 |
| Cont. 4 | 34 | 523 | 84 |
| Cont. 5 | 61 | 548 | 84 |

Control 4

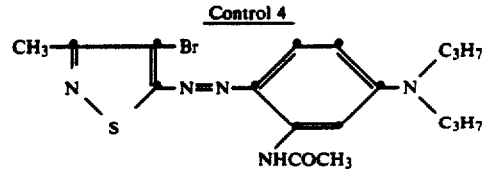

Control 5

TABLE 4-continued

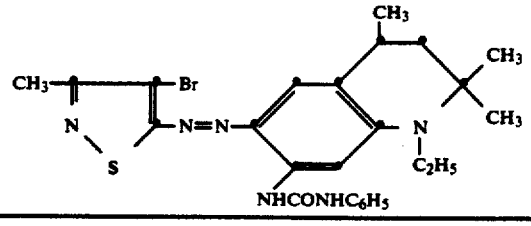

The dyes of the invention are all of good or acceptable hue and show superior light stability compared to the control dyes having close structural similarity.

The invention has been described in detail with particular reference to preferred embodiments thereof, but it will be understood that variations and modifications can be effected within the spirit and scope of the invention.

What is claimed is:

1. A magenta dye-donor element for thermal dye transfer comprising a support having thereon a dye layer comprising a magenta dye dispersed in a polymeric binder, said magenta dye having the formula:

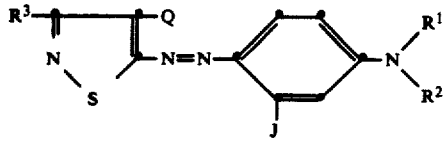

wherein $R^1$ and $R^2$ may each independently be hydrogen, substituted or unsubstituted alkyl or allyl of from 1 to about 6 carbon atoms, substituted or unsubstituted cycloalkyl of from about 5 to about 7 carbon atoms, substituted or unsubstituted aryl of from about 5 to about 10 carbon atoms; or $R^1$ and $R^2$ may be taken together to form a ring; or a 5- or 6-membered heterocyclic ring may be formed with $R^1$ or $R^2$, the nitrogen to which $R^1$ or $R^2$ is attached, and either carbon atom ortho to the carbon attached to said nitrogen atom;

$R^3$ may be hydrogen, substituted or unsubstituted alkyl of from 1 to about 6 carbon atoms, substituted or unsubstituted aryl of from about 5 to about 10 carbon atoms, alkylthio or halogen;

J may be substituted or unsubstituted alkyl of from 1 to about 6 carbon atoms, substituted or unsubstituted aryl of from about 5 to about 10 carbon atoms or NHA, where A is an acyl or sulfonyl radical; and Q may be cyano, thicyanato, alkylthio or alkoxycarbonyl.

2. The element of claim 1 wherein $R^3$ is methyl and Q is CN.

3. The element of claim 1 wherein J is $—NHCOCH_3$.

4. The element of claim 1 wherein $R^1$ is $C_2H_5$ and $R^2$ is $CH_2C_6H_5$, cyclohexyl or $CH_2CH_2O_2CCH_3$.

5. The element of claim 1 wherein $R^1$ and $R^2$ are each n—$C_3H_7$ or $C_2H_5$.

6. The element of claim 1 wherein a dye-barrier layer is located between said dye layer and said support.

7. The element of claim 1 wherein the side of the support opposite the side bearing said dye layer is coated with a slipping layer comprising a lubricating material.

8. The element of claim 1 wherein said support comprises poly(ethylene terephthalate).

9. The element of claim 1 wherein said dye layer comprises sequential repeating areas of cyan, yellow and said magenta dye.

10. In a process of forming a magenta dye transfer image comprising imagewise-heating a dye-donor element comprising a support bearing a dye layer comprising a magenta dye dispersed in a polymeric binder and transferring a magenta dye image to a dye-receiving element to form said magenta dye transfer image, the improvement wherein said magenta dye comprises a substituted 5-arylazoisothiazole having the formula:

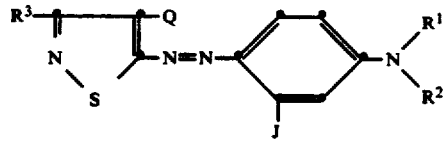

wherein $R^1$ and $R^2$ may each independently be hydrogen, substituted or unsubstituted alkyl or allyl of from 1 to about 6 carbon atoms, substituted or unsubstituted cycloalkyl of from about 5 to about 7 carbon atoms, substituted or unsubstituted aryl of from about 5 to about 10 carbon atoms; or $R^1$ and $R^2$ may be taken together to form a ring; or a 5- or 6-membered heterocyclic ring may be formed with $R^1$ or $R^2$, the nitrogen to which $R^1$ or $R^2$ is attached, and either carbon atom ortho to the carbon attached to said nitrogen atom;

$R^3$ may be hydrogen, substituted or unsubstituted alkyl of from 1 to about 6 carbon atoms, substituted or unsubstituted aryl of from about 5 to about 10 carbon atoms, alkylthio or halogen;

J may be substituted or unsubstituted alkyl of from 1 to about 6 carbon atoms, substituted or unsubstituted aryl of from about 5 to about 10 carbon atoms or NHA, where A is an acyl or sulfonyl radical; and Q may be cyano, thiocyanato, alkylthio or alkoxycarbonyl.

11. The process of claim 10 wherein said support is poly(ethylene terephthalate) which is coated with sequential repeating areas of cyan, yellow and said magenta dye, and said process steps are sequentially performed for each color to obtain a three-color dye transfer image.

12. In a thermal dye transfer assemblage comprising:

(a) a magenta dye-donor element comprising a support having thereon a dye layer comprising a magenta dye dispersed in a polymeric binder, and (b) a dye receiving element comprising a support having thereon a dye image-receiving layer, said dye-receiving element being in a superposed relationship with said magenta dye-donor element so that said dye layer is in contact with said dye image-receiving layer, the improvement wherein said magenta dye has the formula:

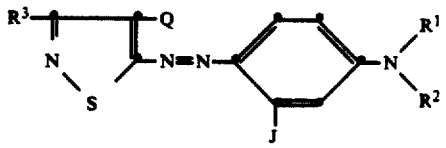

wherein $R^1$ and $R^2$ may each independently be hydrogen, substituted or unsubstituted alkyl or allyl of from 1 to about 6 carbon atoms, substituted or unsubstituted cycloalkyl of from about 5 to about 7 carbon atoms, substituted or unsubstituted aryl of from about 5 to about 10 carbon atoms; or $R^1$ and $R^2$ may be taken together to form a ring; or a 5- or 6-membered heterocyclic ring may be formed with $R^1$ or $R^2$, the nitrogen to which $R^1$ or $R^2$ is attached, and either carbon atom ortho to the carbon attached to said nitrogen atom;

$R^3$ may be hydrogen, substituted or unsubstituted alkyl of from 1 to about 6 carbon atoms, substituted or unsubstituted aryl of from about 5 to about 10 carbon atoms, alkylthio or halogen;

J may be substituted or unsubstituted alkyl of from 1 to about 6 carbon atoms, substituted or unsubstituted aryl of from about 5 to about 10 carbon atoms or NHA, where A is an acyl or sulfonyl radical; and Q may be cyano, thiocyanato, alkylthio or alkoxycarbonyl.

13. The assemblage of claim 12 wherein $R^3$ is methyl and Q is CN.

14. The assemblage of claim 12 wherein J is —NH—$COCH_3$.

15. The assemblage of claim 12 wherein $R^1$ is $C_2H_5$ and $R^2$ is $CH_2C_6H_5$, cyclohexyl or $CH_2CH_2O_2CCH_3$.

16. The assemblage of claim 12 wherein $R^1$ and $R^2$ are each n—$C_3H_7$ or $C_2H_5$.

17. The assemblage of claim 12 wherein said support of the dye-donor element comprises poly(ethylene terephthalate).

*18. A thermal transfer printing sheet comprising a support having thereon a dye layer comprising a magenta azo dye dispersed in a polymeric binder, said magenta azo dye having the formula:*

A—N=N—E

*wherein:*

*A is isothiazol-5-yl substituted in the 3-position by hydrogen, substituted or unsubstituted alkyl of from 1 to about 6 carbon atoms, substituted or unsubstituted aryl of from about 5 to about 10 carbon atoms, alkylthio or halogen, and substituted in the 4-position by cyano, thiocyanato, alkylthio or alkoxycarbonyl; and*

*E is a group of the formula:*

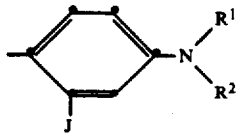

*wherein*

*J may be substituted or unsubstituted alkyl of from 1 to about 6 carbon atoms, substituted or unsubstited aryl of from about 5 to about 10 carbon atoms or NHA, where A is an acyl or sulfonyl radical; and*

*$R^1$ and $R^2$ may each independently be hydrogen; substituted or unsubstituted alkyl or allyl of from 1 to about 6 carbon atoms; substituted or unsubstituted cycloalkyl of from about 5 to about 7 carbon atoms, substituted or unsubstituted aryl of from about 5 to about 10 carbon atoms; or $R^1$ and $R^2$ may be taken together to form a ring; or a 5- or 6-membered heterocyclic ring may be formed with $R^1$ or $R^2$, the nitrogen to which $R^1$ or $R^2$ is attached, and either carbon atom ortho to the carbon attached to said nitrogen atom.*

*19. A thermal transfer printing sheet according to claim 18 wherein A is selected from 4-cyanoisothiazol-5-yl and 3-methyl-4-cyanoisothiazol-5-yl.*

*20. A transfer printing sheet according to claim 18 wherein the azo dye conforms to the formula:*

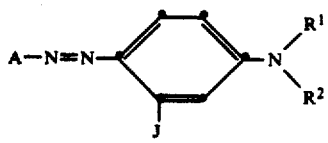

*wherein*

*A is selected from 4-cyanoisothiazol-5-yl and 3-methyl-4-cyanoisothiazol-5-yl;*

*J is selected from unsubstituted alkyl of from 1 to about 6 carbon atoms and NHA, where A is an acyl radical; and*

*$R^1$ and $R^2$ are each independently selected from hydrogen; unsubstituted alkyl of from 1 to about 6 carbon atoms; or alkyl of from 1 to about 6 carbon atoms substituted by a group selected from alkoxy, acyloxy, cyano and halogen.*

*21. A transfer printing process which comprises contacting a transfer sheet coated with a dye according to claim 18 with a receiver sheet, so that the dye is adjacent to the receiver sheet, and selectively heating areas of the transfer sheet to a temperature from 250°–400° C.* for a period of from 0.5 to 8.3 msec whereby dye in the heated areas of the transfer sheet may be selectively transferred to the receiver sheet.

*22. A thermal transfer printing sheet comprising a support having thereon a dye layer comprising a magenta azo dye dispersed in a polymeric binder, said magenta azo dye having the formula:*

*A—N=N—E*

*wherein:*

*A is isothiazol-5-yl substituted in the 3-position by hydrogen, halogen or substituted alkyl of from 1 to about 6 carbon atoms, and substituted in the 4-position by cyano, thiocyanato or alkoxycarbonyl; and*

*E is a group of the formula:*

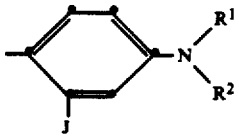

*wherein*

*J may be unsubstituted alkyl of from 1 to about 6 carbon atoms or NHA, where A is an acyl radical; and*

*$R^1$ and $R^2$ may each independently be hydrogen; unsubstituted alkyl of from 1 to about 6 carbon atoms; or alkyl of from 1 to about 6 carbon atoms substituted by a group selected from aryl, halogen, cyano, alkoxy or acyloxy.*

*23. A thermal transfer printing sheet comprising a support having thereon a dye layer comprising a magenta azo dye dispersed in a polymeric binder, said magenta azo dye having the formula:*

*A—N=N—E* wherein:

*A is isothiazol-5-yl substituted in the 3-position by hydrogen, halogen or substituted or unsubstituted alkyl of from 1 to about 6 carbon atoms, and substituted in the 4-position by cyano, thiocyanato or alkoxycarbonyl; and*

*E is a group of the formula:*

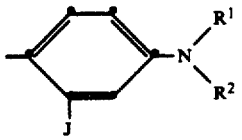

*wherein*

*J may be unsubstituted alkyl of from 1 to about 6 carbon atoms or NHA, where A is an acyl radical; and*

*$R^1$ and $R^2$ may each independently be hydrogen; unsubstituted alkyl of from 1 to about 6 carbon atoms; or alkyl of from 1 to about 6 carbon atoms substituted by a group selected from aryl, halogen, cyano, alkoxy or acyloxy.*

*24. A thermal transfer printing sheet comprising a support having thereon a dye layer comprising a magenta azo dye dispersed in a polymeric binder, said magenta azo dye having the formula:*

*A—N=N—E*

*wherein:*

*A is isothiazol-5-yl substituted in the 3-position by hydrogen, substituted or unsubstituted alkyl of from 1 to about 6 carbon atoms, substituted or unsubstituted aryl of from about 5 to about 10 carbon atoms, alkylthio or halogen, and substituted in the 4-position by cyano, thiocyanato, alkylthio or alkoxycarbonyl; and*

*E is a group of the formula:*

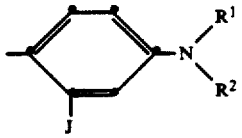

*wherein*

*J may be substituted or unsubstituted alkyl of from 1 to about 6 carbon atoms, substituted or unsubstituted aryl of from about 5 to about 10 carbon atoms or NHA, where A is an acyl or sulfonyl radical; and*

*$R^1$ and $R^2$ may each independently be hydrogen; unsubstituted alkyl or allyl of from 1 to about 6 carbon atoms; alkyl or allyl of from 1 to about 6 carbon atoms substituted by a group selected from hydroxy, acyloxy, alkoxy, aryl, cyano, acylamido, or halogen; substituted or unsubstituted cycloalkyl of from about 5 to about 7 carbon atoms, substituted or unsubstituted aryl of from about 5 to about 10 carbon atoms; or $R^1$ and $R^2$ may be taken together to form a ring; or a 5- or 6-membered heterocyclic ring may be formed with $R^1$ or $R^2$, the nitrogen to which $R^1$ or $R^2$ is attached, and either carbon atom ortho to the carbon attached to said nitrogen atom.*

*25. A thermal transfer printing sheet comprising a substrate having a coating comprising at least one azo dye of the formula:*

*A—N=N—E*

*wherein:*

*A is isothiazol-5-yl substituted in the 3-position by hydrogen, substituted or unsubstituted alkyl of from 1 to about 6 carbon atoms, substituted or unsubstituted aryl of from about 5 to about 10 carbon atoms, alkylthio or halogen, and substituted in the 4-position by cyano, thiocyanato, alkylthio or alkoxycarbonyl; and*

*E is a group of the formula:*

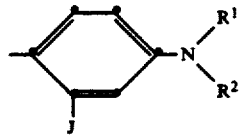

*wherein*

*J may be substituted or unsubstituted alkyl of from 1 to about 6 carbon atoms, substituted or unsubstituted aryl of from about 5 to about 10 carbon atoms or NHA, where A is an acyl or sulfonyl radical; and*

*$R^1$ and $R^2$ may each independently be hydrogen; substituted or unsubstituted alkyl or allyl of from 1 to about 6 carbon atoms; substituted or unsubstituted cycloalkyl of from about 5 to about 7 carbon atoms, substituted or unsubstituted aryl of from about 5 to about 10 carbon atoms; or $R^1$ and $R^2$ may be taken together to form a ring; or a 5- or 6-membered heterocyclic ring may be formed with $R^1$ or $R^2$, the nitrogen to which $R^1$ or $R^2$ is attached to said nitrogen atom.*

*26. A thermal transfer printing sheet according to claim 25 wherein A is selected from 4-cyanoisothiazol-5-yl and 3-methyl-4-cyanoisothiazol-5-yl.*

*27. A transfer printing sheet according to claim 25 wherein the azo dye conforms to the formula:*

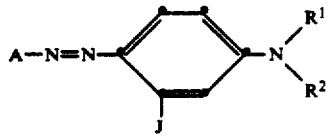

*wherein*

*is selected from 4-cyanoisothiazol-5-yl and 3-methyl-4-cyanoisothiazol-5-yl;*

*J is selected from unsubstituted alkyl of from 1 to about 6 carbon atoms and NHA, where A is an acyl radical; and*

*$R^1$ and $R^2$ are each independently selected from hydrogen-unsubstituted alkyl of from 1 to about 6 carbon atoms; or alkyl of from 1 to about 6 carbon atoms substituted by a group selected from alkoxy, acyloxy, cyano and halogen.*

*28. A transfer printing process which comprises contacting a transfer sheet coated with a dye according to claim 25 with a receiver sheet, so that the dye is adjacent to the receiver sheet, and selectively heating areas of the transfer sheet to a temperature from 250°–400° C. for a period of from 0.5 to 8.3 msec whereby dye in the heated areas of the transfer sheet may be selectively transferred to the receiver sheet.*

*29. A thermal transfer printing sheet comprising a substrate having a coating comprising at least one azo dye of the formula:*

*A—N=N—E*

*wherein:*

*A is isothiazol-5-yl substituted in the 3-position by hydrogen, halogen or substituted alkyl of from 1 to about 6 carbon atoms, and substituted in the 4-position by cyano, thiocyanato or alkoxycarbonyl; and*

*E is a group of the formula:*

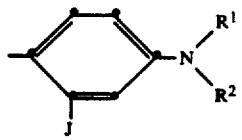

*wherein*

*J may be unsubstituted alkyl of from 1 to about 6 carbon atoms or NHA, where A is an acyl radical; and*

$R^1$ and $R^2$ may each independently by hydrogen; unsubstituted alkyl of from 1 to about 6 carbon atoms; or alkyl of from 1 to about 6 carbon atoms substituted by a group selected from aryl, halogen, cyano, alkoxy or acyloxy.

*30. A thermal transfer printing sheet comprising a substrate having a coating comprising at least one azo dye of the formula:*

*A—N=N—E*

*wherein:*

*A is isothiazol-5-yl substituted in the 3-position by hydrogen, halogen or substituted or unsubstituted alkyl of from 1 to about 6 carbon atoms, and substituted in the 4-position by cyano, thiocyanato or alkoxycarbonyl; and*

*E is a group of the formula:*

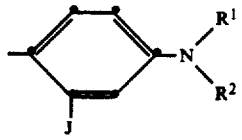

*wherein*

*J may be unsubstituted alkyl of from 1 to about 6 carbon atoms or NHA, where A is an acyl radical; and*

$R^1$ and $R^2$ may each independently be hydrogen; unsubstituted alkyl of from 1 to about 6 carbon atoms; or alkyl of from 1 to about 6 carbon atoms substituted by a group selected from aryl, halogen, cyano, alkoxy or acyloxy.

*31. A thermal transfer printing sheet comprising a substrate having a coating comprising at least one azo dye of the formula:*

*A—N=N—E*

*wherein:*

*A is isothiazol-5-yl substituted in the 3-position by hydrogen, substituted or unsubstituted alkyl of from 1 to about 6 carbon atoms, substituted or unsubstituted aryl of from about 5 to about 10 carbon atoms, alkylthio or halogen, and substituted in the 4-position by cyano, thiocyanato, alkylthio or alkoxycarbonyl; and*

*E is a group of the formula:*

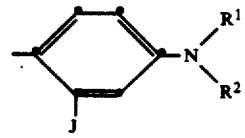

*wherein*

*J may be substituted or unsubstituted alkyl of from 1 to about 6 carbon atoms, substituted or unsubstituted aryl of from about 5 to about 10 carbon atoms or NHA, where A is an acyl or sulfonyl radical; and*

*$R^1$ and $R^2$ may each independently be hydrogen; unsubstituted alkyl or allyl of from 1 to about 6 carbon atoms; alkyl or allyl of from 1 to about 6 carbon atoms substituted by a group selected from hydroxy, acyloxy, alkoxy, aryl, cyano, acylamido, or halogen; substituted or unsubstituted cycloalkyl of from about 5 to about 7 carbon atoms, substituted or unsubstituted aryl of from about 5 to about 10 carbon atoms; or $R^1$ and $R^2$ may be taken together to form a ring; or a 5-or 6-membered heterocyclic ring may be formed with $R^1$ or $R^2$, the nitrogen to which $R^1$ or $R^2$ is attached, and either carbon atom ortho to the carbon attached to said nitrogen atom.*

* * * * *

UNITED STATES PATENT AND TRADEMARK OFFICE

CERTIFICATE OF CORRECTION

PATENT NO. : Re. 33,819

DATED : February 11, 1992

INVENTOR(S) : William H. Moore, et al

It is certified that error appears in the above-identified patent and that said Letters Patent is hereby corrected as shown below:

Column 13, line 53, "unsubstited" should read --unsubstituted--.

Column 16, line 25, after "attached" insert --, and either carbon atom ortho to the carbon --.

Column 16, line 40, before "is" insert --A--.

Column 16, line 46, "gen-unsubstituted" should read --gen; unsubstituted--.

Signed and Sealed this

First Day of June, 1993

*Attest:*

*Attesting Officer*

Michael K. Kirk

MICHAEL K. KIRK

*Acting Commissioner of Patents and Trademarks*